US012704742B2

(12) United States Patent
Angervaks et al.

(10) Patent No.: US 12,704,742 B2
(45) Date of Patent: Aug. 11, 2026

(54) OPTICAL COMBINER FOR DISPLAYING AUGMENTED REALITY WITH USER'S VISION CORRECTION, METHOD FOR OPERATING THE OPTICAL COMBINER, AUGMENTED REALITY GLASSES FOR DISPLAYING AUGMENTED REALITY WITH USER'S VISION CORRECTION

(71) Applicant: Samsung Electronics Co., Ltd., Suwon-si (KR)

(72) Inventors: Aleksandr Evgenyevich Viacheslavovich Angervaks, St. Petersburg (RU); Roman Aleksandrovich Aleksandrovich Okun, St. Petersburg (RU); Anastasia Sergeevna Germanovich Perevoznikova, Izhevsk (RU); Nikolay Viktorovich Muravyev, Moscow (RU); Gavril Nikolaevich Vostrikov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 18/669,080

(22) Filed: May 20, 2024

(65) Prior Publication Data

US 2024/0329419 A1 Oct. 3, 2024

Related U.S. Application Data

(63) Continuation of application No. PCT/KR2024/000273, filed on Jan. 5, 2024.

(30) Foreign Application Priority Data

Mar. 28, 2023 (RU) ................................ 2023107401

(51) Int. Cl.
*G02B 27/42* (2006.01)
*G02B 6/34* (2006.01)
*G02B 27/01* (2006.01)

(52) U.S. Cl.
CPC ........... *G02B 27/4205* (2013.01); *G02B 6/34* (2013.01); *G02B 27/0172* (2013.01); *G02B 2027/0132* (2013.01); *G02B 2027/0178* (2013.01)

(58) Field of Classification Search
CPC .. G02B 27/4205; G02B 6/34; G02B 27/0172; G02B 2027/0132; G02B 2027/0178; G02B 2027/0174; G02B 27/0081
See application file for complete search history.

(56) References Cited

U.S. PATENT DOCUMENTS 9,348,143 B2 5/2016 Gao et al.
9,389,422 B1 7/2016 Cakmakci et al.
(Continued)

FOREIGN PATENT DOCUMENTS

CN 103471813 B 9/2015
CN 105929545 A 9/2016
(Continued)

OTHER PUBLICATIONS

International Search Report dated Apr. 12, 2024, issued in International Patent Application No. PCT/KR2024/000273.
(Continued)

*Primary Examiner* — Charles S Chang
(74) *Attorney, Agent, or Firm* — Jefferson IP Law, LLP

(57) ABSTRACT

The disclosure relates to augmented reality devices. An optical combiner configured to display augmented reality with user's vision correction is provided. The optical combiner includes a compensator, a waveguide having an in-coupling diffractive optical elements (DOE) and an out-
(Continued)

coupling DOE, and a virtual image projector. The waveguide has a thickness gradient along the first and second side of the waveguide such that with propagation of virtual image-forming rays inside the waveguide from the in-coupling DOE to the out-coupling DOE, the incidence angle of the rays on walls inside the waveguide increases. The out-coupling DOE is placed opposite a user's eye, and is configured to output virtual image-forming rays, incident on the out-coupling DOE at an angle equal to or greater than the smallest angle of predetermined angular selectivity range of the out-coupling DOE, from the waveguide into the user's eye.

30 Claims, 9 Drawing Sheets

(56) References Cited

U.S. PATENT DOCUMENTS

| | | | |
|---|---|---|---|
| 9,632,312 | B1 | 4/2017 | Cakmakci et al. |
| 10,146,054 | B2 | 12/2018 | Martinez et al. |
| 10,466,477 | B2 | 11/2019 | Samec et al. |
| 10,983,346 | B2 | 4/2021 | Vallius et al. |
| 10,983,355 | B2 | 4/2021 | Khan |
| 11,221,485 | B2 | 1/2022 | Ma et al. |
| 11,353,706 | B2 | 6/2022 | Guo et al. |
| 11,474,357 | B2 | 10/2022 | Kim |
| 2019/0187471 | A1 | 6/2019 | Ma et al. |
| 2020/0166758 | A1 | 5/2020 | Ma et al. |
| 2020/0183170 | A1 | 6/2020 | Amitai et al. |
| 2020/0368616 | A1 | 11/2020 | Delamont |
| 2020/0371356 | A1 | 11/2020 | Khan |
| 2020/0400946 | A1 | 12/2020 | Waldern et al. |
| 2021/0389592 | A1 | 12/2021 | Puetz et al. |
| 2022/0050309 | A1 | 2/2022 | Menke |
| 2022/0091323 | A1 | 3/2022 | Yaroshchuk et al. |
| 2022/0335692 | A1 | 10/2022 | Chiu et al. |
| 2022/0357497 | A1* | 11/2022 | Ronen .................. G02B 6/0031 |
| 2022/0397765 | A1 | 12/2022 | Cakmakci et al. |
| 2023/0029214 | A1 | 1/2023 | Chuang et al. |
| 2023/0152585 | A1 | 5/2023 | Zhang et al. |
| 2023/0324706 | A1 | 10/2023 | Schowengerdt |

FOREIGN PATENT DOCUMENTS

| | | | |
|---|---|---|---|
| CN | 105934902 | A | 9/2016 |
| CN | 110660036 | A | 1/2020 |
| CN | 111587393 | A | 8/2020 |
| CN | 112558751 | A | 3/2021 |
| CN | 113272712 | A | 8/2021 |
| CN | 114296243 | A | 4/2022 |
| CN | 218213630 | U | 1/2023 |
| EP | 02887124 | A1 | 6/2015 |
| KR | 10-2329742 | B1 | 11/2021 |
| WO | 2015-081313 | A2 | 6/2015 |
| WO | 2017-149526 | A2 | 9/2017 |
| WO | 2018/165117 | A1 | 9/2018 |
| WO | 2018-224847 | A2 | 12/2018 |
| WO | 2019-141967 | A1 | 7/2019 |
| WO | 2019-221539 | A1 | 11/2019 |
| WO | 2020-264031 | A1 | 12/2020 |
| WO | 2021-119021 | A2 | 6/2021 |
| WO | 2021-197100 | A1 | 10/2021 |

OTHER PUBLICATIONS

Russian Search Report dated May 29, 2023, issued in Russian Patent Application No. 2023107401.

Russian Notice of Allowance dated Jun. 8, 2023, issued in Russian Patent Application No. 2023107401.

Optical system of the eye Dec. 2019. (https://studfile.net/preview/10641980/page:2/).

European Search Report dated Apr. 24, 2026, issued in European Application No. 24780967.6.

* cited by examiner

FIG. 2

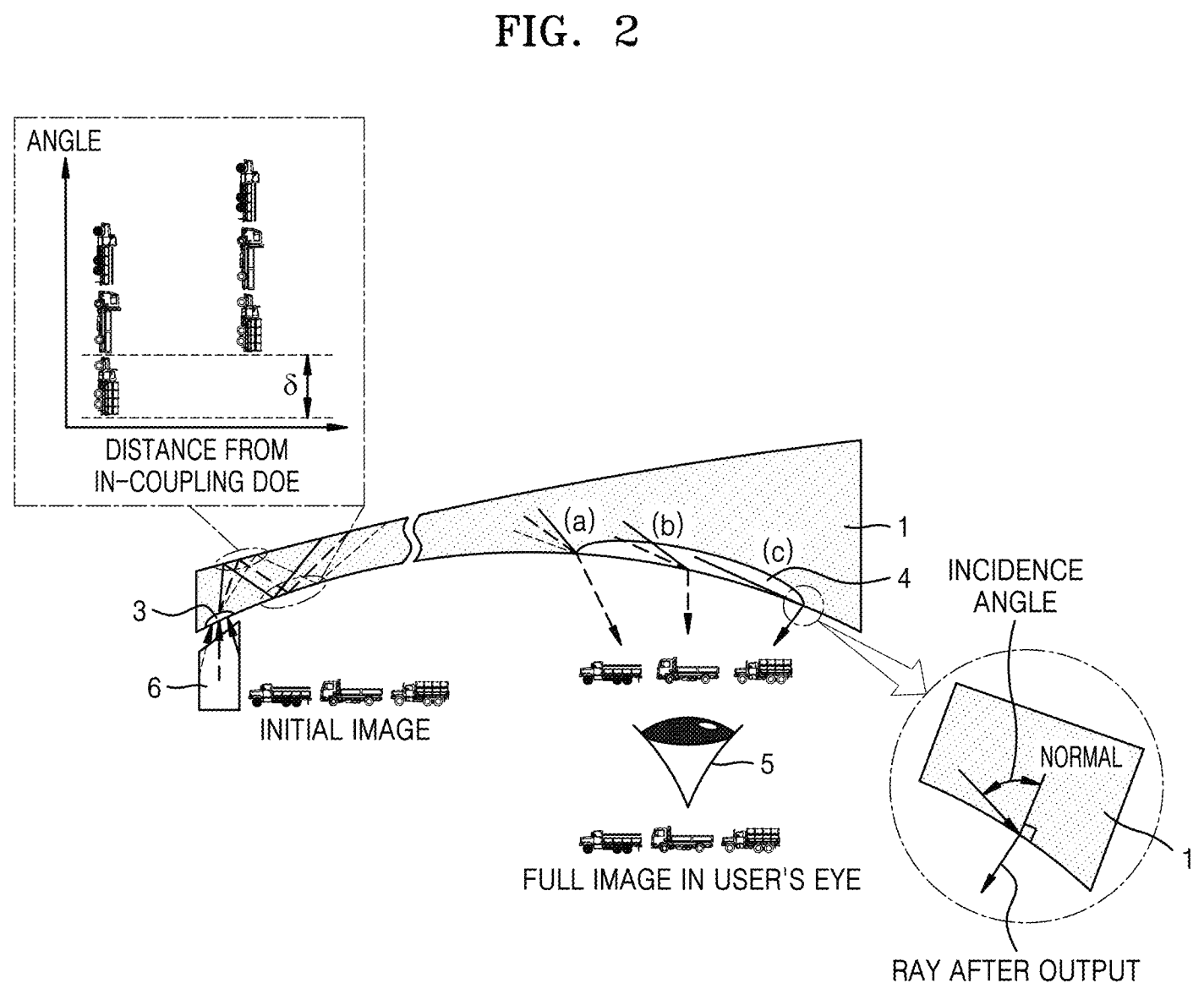

INCIDENCE ANGLE
NORMAL
RAY AFTER OUTPUT
FULL IMAGE IN USER'S EYE
INITIAL IMAGE
DISTANCE FROM IN-COUPLING DOE
ANGLE
δ
(a)
(b)
(c)
1
3
4
5
6

OPTICAL COMBINER FOR DISPLAYING AUGMENTED REALITY WITH USER'S VISION CORRECTION, METHOD FOR OPERATING THE OPTICAL COMBINER, AUGMENTED REALITY GLASSES FOR DISPLAYING AUGMENTED REALITY WITH USER'S VISION CORRECTION

CROSS-REFERENCE TO RELATED APPLICATION(S)

This application is a continuation application, claiming priority under § 365 (c), of an International application No. PCT/KR2024/000273, filed on Jan. 5, 2024, which is based on and claims the benefit of a Russian patent application number 2023107401, filed on Mar. 28, 2023, in the Russian Intellectual Property Office, the disclosure of which is incorporated by reference herein in its entirety.

FIELD OF THE INVENTION

The disclosure relates to augmented reality devices. More particularly, the disclosure relates to augmented reality glasses with user's vision correction.

BACKGROUND OF THE INVENTION

Wearable augmented reality (AR) glasses are a personal device that can be used by the user as a source of video information (image) projected directly into the user's eye in the form of a virtual image augmenting the real scene around the user. When designing augmented reality glasses, account must be taken of users with visual acuity problems, such as hyperopia, myopia, astigmatism and other visual aberrations. There is a need for augmented reality glasses with a wide field of view (FOV, angular characteristic showing in what range of angles it is possible to observe virtual images augmenting the real world around the user), low weight and cost, small size and high resolution, as well as with optical power for users with visual acuity problems. Such wearable devices can replace any source of video information for the user, such as televisions (TVs), smartphones, or the like.

Systems of augmented reality glasses should satisfy the following requirements:

- wide field of view to enable overlapping of a virtual image on the large real word scene seen by the human eye;
- high quality of image, i.e., high resolution, high contrast, or the like.;
- low weight;
- small size; and
- low cost.

When using augmented reality glasses, a user who needs prescription glasses is forced to put the augmented reality glasses over the prescription glasses to see both the virtual image and the surrounding real world clearly and not blurry. This is uncomfortable, especially when worn for a long time.

Optical combiner is an optical device for combining a virtual image with a real scene surrounding the user. Currently, the most widely used combiners comprise flat waveguides having diffractive optical elements (DOE) on the surface to input, converse and output optical radiation. Flat waveguide is a transparent optical material plate with two plane-parallel surfaces. A beam of parallel rays inside the waveguide can propagate undistorted to any distance. Augmented reality devices with such combiners are lightweight, have small size and low cost, can provide a wide field of view, and have high transmissive ability, that is, high real image transmission.

However, in such devices, the edges where image projectors are arranged are far from the temporal part of the user's head, so such glasses take up a large space in use. In addition, such combiners form a virtual image not only on the user's eye-ward side, but also on the side opposite from the user. As a result, an external observer, at a certain location, will be able, just like the user, to partially or completely see the virtual image generated for the user, which may be undesirable.

A possible optical combiner comprises curved waveguides placed on the user's head such that they go around the user's head oval; glasses with such a combiner will be more compact and convenient, and have smaller dimensions; a device with such a combiner will be more ergonomic and aesthetic. However, the use of a curved waveguide as a combiner involves substantial problems in converting and transmitting optical radiation through it.

For example, consider a case of a parallel beam of rays falling on a curved waveguide. Let this beam be introduced into the waveguide through an input constant-period diffraction grating. The beam of parallel rays incident on the waveguide will turn inside the waveguide into a non-parallel beam, the rays of which will propagate inside the waveguide at different angles. This effect should be taken into account and compensated when designing augmented reality glasses with a curved combiner.

U.S. Pat. No. 10,466,477 B2 (publication date 5 Nov. 2019) discloses an augmented reality display system comprising a set of flat waveguides with optical power. Image is fed from the projector through waveguides to the user's eye. The virtual image, passing through the waveguides, undergoes a transformation in accordance with the user's vision. For example, the system corrects the virtual image according to the user's vision. Drawbacks of the system include a thick stack of waveguides, each having own optical power, and the use of multiple deformable optical elements making system fabrication complex. The system is bulky, cannot be used in daily life. No correction for real scene is provided in the system.

U.S. Pat. No. 9,632,312 B1 (publication date 25 Apr. 2017) discloses an optical apparatus including an optical element with an eye-ward facing surface and an external world facing surface. The optical apparatus further includes a diffractive optical element ("DOE") disposed to substantially follow a curvature of the eye-ward facing surface. The curvature of the eye-ward facing surface of the first optical element is configured to collimate the image light within an eyebox sized area. However, the apparatus corrects only virtual image, i.e., no correction for real image is provided.

U.S. Pat. No. 9,389,422 B1 (publication date 12 Jul. 2016) discloses a head wearable display comprising a shaped light guide component for guiding the light received at a display peripheral place offset from a viewing region, and emitting the light in the viewing region. Light is introduced into the light guide component such that the light propagates within the light component by total internal reflection. Due to the shape of the prism, the light propagating inside changes its angle of reflection, and thus, after several reflections, some of the light ceases to experience total internal reflection and exits the light guide component. To equalize brightness of the displayed image, partially reflective coatings are applied in the region of the user's eyes, which is a drawback of the device, since the partially reflective coating reduces brightness of light from the real scene. Therefore, no correction for the real scene image is provided in the device.

The closest prior art is disclosed in US 2021/0389592 A1 (publication date 16 Dec. 2021). The disclosure uses a free-form waveguide through which a virtual image is transmitted. An additional optical element is glued to the waveguide using a viscous or liquid substance. The device corrects the image of both the virtual scene and the real scene depending on the user's acuity problems. Main drawback of the device is that the waveguide and the additional optical element are glued together, which imposes restrictions on the conditions of total internal reflection inside the waveguide, since just the contrast between the refractive index of the waveguide and the environment is the key factor for expanding the range of angles at which the virtual reality image is transmitted, that is the field of view. In the device, part of the rays will propagate in the substance with which the additional optical element is glued to the waveguide, which means that the field of view is restricted and quality of the virtual reality display deteriorates.

Thus, there is a need to provide devices of augmented reality glasses with a wide field of view, low weight and cost, having small size and high resolution, and with an optical power for users with acuity problems.

The above information is presented as background information only to assist with an understanding of the disclosure. No determination has been made, and no assertion is made, as to whether any of the above might be applicable as prior art with regard to the disclosure.

SUMMARY OF THE INVENTION

Aspects of the disclosure are to address at least the above-mentioned problems and/or disadvantages and to provide at least the advantages described below. Accordingly, an aspect of the disclosure is to provide augmented reality glasses with user's vision correction.

Additional aspects will be set forth in part in the description which follows and, in part, will be apparent from the description, or may be learned by practice of the presented embodiments.

In accordance with an aspect of the disclosure, an optical combiner for displaying augmented reality with user's vision correction is provide. The optical combiner includes a compensator, a waveguide, a virtual image projector, wherein the compensator is configured to pass an external world image through its first side located opposite an external world, and its second side located opposite to the first side, wherein the waveguide has a first side located on the user side and a second side located opposite to the first side, and includes an in-coupling diffractive optical element (DOE) and an out-coupling DOE placed on one of the first side or the second side of the waveguide, wherein a gap is provided between the second side of the compensator and the second side of the waveguide, the gap being configured to pass the external world image that has passed the compensator into the waveguide, wherein the waveguide is configured to pass the external world image, wherein the compensator, gap and waveguide are configured to correct user's vision problems when a user views the external world image, wherein the virtual image projector is arranged to input virtual image-forming rays via the in-coupling DOE into the waveguide, wherein the waveguide is configured to propagate virtual image-forming rays from the in-coupling DOE to the out-coupling DOE by total internal reflection from walls inside the waveguide, and output a virtual image via the out-coupling DOE to a user's eye, wherein the waveguide has a thickness gradient along the first and second side of the waveguide such that as the virtual image-forming rays propagate inside the waveguide from the in-coupling DOE to the out-coupling DOE, incidence angle of the rays on the walls inside the waveguide increases, the first side of the waveguide has a curvature with a center thereof located on the user eye-ward side, wherein the out-coupling DOE is placed opposite the user's eye, and is configured to output virtual image-forming rays, incident on the out-coupling DOE at an angle equal to or greater than a smallest angle of a predetermined angular selectivity range of the out-coupling DOE, from the waveguide to the user's eye.

The gap can have a uniform thickness along its entire length. The gap can have a thickness gradient along the compensator and the waveguide. The gap can have a thickness gradient in the direction from the compensator to the waveguide. The gap can have a thickness gradient in the direction from the waveguide to the compensator. The compensator can be shaped such that the gap is curved. The waveguide can be shaped such that the gap is curved. The compensator and the waveguide can be shaped such that the gap is straight. The compensator, gap and waveguide can be configured to function as a diverging lens. The compensator, gap and waveguide can be configured to function as a converging lens. The compensator, gap and waveguide can be configured to function as a cylindrical lens. The compensator, gap and waveguide can be configured to function as a toric lens. The compensator and the waveguide can be fixed in a frame such that they are separated by a gap. The gap can be air gap. The gap can be filled with a liquid. The liquid can be a photochromic liquid. The gap can be formed by a layer of liquid crystals. The out-coupling DOE can be formed by a layer of liquid crystals. The out-coupling DOE can be recorded as a holographic diffraction grating. The out-coupling DOE can be a relief-phase selective diffraction grating. The out-coupling DOE can be recorded as a multiplex hologram. The out-coupling DOE can be a volume Bragg diffraction grating with angle-selective diffraction. The out-coupling DOE can be placed on the first surface of the waveguide. The out-coupling DOE can be placed on the second surface of the waveguide. The out-coupling DOE can have diffraction efficiency over 90%.

In accordance with another aspect of disclosure, a method for operating an optical combiner for displaying augmented reality with user's vision correction is provided. The method includes transferring a virtual image to user's eye, including generating a virtual image by a virtual image projector, inputting, via an in-coupling DOE, virtual image-forming rays into a waveguide, wherein the virtual image-forming rays propagate from the in-coupling DOE to an out-coupling DOE in waveguide mode by total internal reflection from walls inside the waveguide, wherein, as the virtual image-forming rays propagate inside the waveguide from the in-coupling DOE to the out-coupling DOE, incidence angle of the rays on the walls inside the waveguide increases, outputting the virtual image-forming rays to the user's eye via the out-coupling DOE such that only the rays incident on the out-coupling DOE at an angle equal to or greater than a smallest angle of a predetermined angular selectivity range of the out-coupling DOE are output, wherein remaining rays propagate further along the waveguide, increasing their incidence angle on the waveguide walls, and are output at an area of the out-coupling DOE, where their incidence angle on the out-coupling DOE becomes equal to or greater than the smallest angle of the predetermined angular selectivity range of the out-coupling DOE, outputting an external world image to the user's eye, including passing an external world image through a compensator, a gap and a waveguide, while correcting the external world image in accordance with user's vision problems, wherein the transferring of the virtual image and the outputting of the external world image are performed simultaneously to form, on the user's retina, an external world image corrected to compensate for the user's vision problems and augmented by the virtual image.

There are provided augmented reality glasses comprising a left eye element and a right eye element, each of the left eye and right eye elements comprising the optical combiner for displaying augmented reality with user's vision correction.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates operation of an in-coupling diffractive optical element (DOE) and operation of an out-coupling DOE according to an embodiment to the disclosure;

Throughout the drawings, it should be noted that like reference numbers are used to depict the same or similar elements, features, and structures.

DETAILED DESCRIPTION OF THE INVENTION

Figure 1:
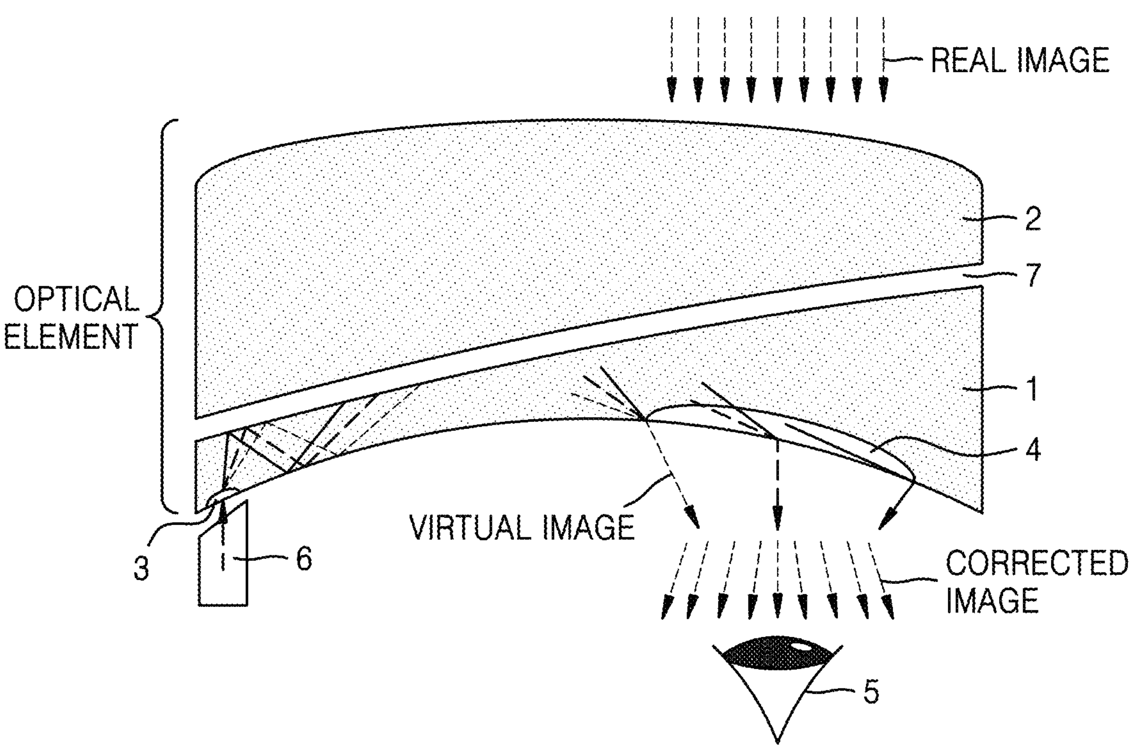
FIG. 1 is an optical combiner according to an embodiment to the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The disclosure provides a user having visual acuity problems with the ability to use augmented reality glasses and see without distortion both a virtual image and a real image of external world without additional prescription glasses. The device also increases the field of view, has a low weight and cost, small size and high resolution.

The following terms are used in description of disclosure:

Virtual image is an imaginary image formed by the continuation of rays that do not converge in the object space. Essentially, virtual image for use in augmented reality devices should be imaginary, otherwise the user will not see it. Real image is an actual image of material objects.

Optical combiner is an optical device that generates, in front of the user, a virtual image augmenting the real scene around the user, while not interfering with the user's observation of the real scene. The disclosure uses, as an optical combiner, a waveguide with thickness gradient, having an in-coupling diffractive optical element (DOE) and an out-coupling DOE, whose centers are located in the same plane with normals to the waveguide surface at these points.

Field of view (FOV) of an optical system (angular field) is the angular range within which the user can observe the image generated by the optical system. Center of field of view corresponds to center of the image, and edge of the field of view corresponds to the edge of the maximum possible image size.

Eye motion box (EMB) is an area within which the eye, when moving, can see the entire field of view, formed by an augmented reality device, without loss and with a given quality, that is, the entire field of view falls into the pupil, particularly, rays from any point in the image. Outside this area, part of the field of view is lost partially or completely, i.e., outside this area, rays from all or from some piece of virtual image do not enter the entrance pupil. The eye is constantly moving, rotating and the pupil is constantly shifting. Eye motion field of optical combiner of the augmented reality device should correspond to the range of possible eye motion of the user.

Exit pupil (or pupil of the optical system) is a paraxial image of the aperture stop in image space, formed by the subsequent part of the optical system in the forward path of rays. This term is common in optics. The main property of exit pupil is that at any point thereof there are rays forming the entire field of view. Waveguide optics encompasses technical solutions for multiplying the exit pupil, i.e., increasing its size, without increasing the optical system size in the direction of the optical axis. Classical optics allows increasing the size of the exit pupil, although with substantial increase in the optical system dimensions; waveguide optics allows this, due to the multiple reflection of beams of rays inside the waveguide, without increasing dimensions in the direction of the optical system axis.

FIG. 1 illustrates an optical combiner according to an embodiment of the disclosure. According to the disclosure, the optical combiner is tailored for a particular user with vision problems.

Referring to FIG. 1, optical combiner consists of two parts as a first optical combiner part 1 and a second optical combiner part 2. The first optical combiner part 1 comprises a waveguide 1 to transfer a virtual image into the user's eye. The waveguide 1 has a first side facing the user's face and a second side located opposite to the first side. An in-coupling DOE 3 and an out-coupling DOE are placed on one of the first or second side. Moreover, the out-coupling DOE is placed opposite the user's eye 5 and outputs the virtual image to the user's eye piecewise, as will be described below. The first waveguide side has a curvature centered on the side of the user's eye 5, and the waveguide 1 further has a thickness gradient along the first and second sides of the waveguide. The waveguide curvature is necessary to provide propagation of the rays emerging from the waveguide via the out-coupling DOE 4 at different angles and thereby form an image at the waveguide output corresponding to the image transferred to the in-coupling DOE 3. Therefore, the rays emerging from the waveguide in the out-coupling DOE 4 portion located closer to the user's temple and corresponding to one edge of the image will have a maximum angle of incidence on the eye. Rays emerging from the waveguide in the out-coupling DOE 4 portion located closer to the user's nose and corresponding to the second opposite edge of the image will have a minimum angle of incidence on the eye. In this case, rays corresponding to the image center will come out from the out-coupling DOE 4 center.

A virtual image projector 6 is arranged to transfer a virtual image through the in-coupling DOE 3 into the waveguide 1.

The second part of the optical combiner comprises a compensator 2. The compensator 2, together with the waveguide 1, is used to compensate for the visual acuity of a user with vision problems. The compensator 2 passes real external world image to the waveguide, which is transparent for the external world image, and then the external world image, compensated for the user's vision, enters the user's eye. The compensator 2 has a first side and a second side located opposite to the first side. The first side of the compensator 2 is placed opposite the external world. The second side of the compensator 2 is placed opposite the second side of the waveguide 1. Length of the second side of the waveguide 1 is equal to length of the second side of the compensator 2. A gap 7 is provided between the second side of the compensator 2 and the second side of the waveguide 1.

It should be noted that the virtual image-forming light does not leave the waveguide in the direction of the gap, but propagates in the waveguide by total internal reflection from the waveguide walls. Light from the external world passes through the compensator, gap, and waveguide, and enters the eye. The compensator 2, gap 7 and waveguide 1 form a corrective eyeglass lens of the related art that corrects user's visual impairments. The user's vision compensation is performed as in normal corrective glasses (see, e.g., https://studfile.net/preview/10641980/page: 2/). The gap in the form of a plane-parallel plate does not introduce any distortion into the transmitted light that makes up the real image. For example, when it is necessary to correct myopia, the structure consisting of the waveguide, gap and compensator is made such that it has negative lens properties, and when it is necessary to correct hyperopia, the structure consisting of the waveguide, gap and compensator is made such that it has positive lens properties.

The gap 7 may have a uniform thickness along the second side of the waveguide and the second side of the compensator. In addition, the gap 7 may have a different thickness along the second side of the waveguide and the second side of the compensator, that is, the gap may have a thickness gradient along the second side of the waveguide and the second side of the compensator.

The compensator 2 may or may not have a thickness gradient along the first and second sides of the compensator.

The optical combiner may be of any shape suitable for the wearer, e.g., the same shape as a spectacle lens.

Light from the external world does not enter the waveguide mode in the waveguide 1, but passes through the waveguide 1, experiencing only refraction therein. Virtual image-forming light propagates along the waveguide 1 in the waveguide mode, i.e., experiencing TIR (total internal reflection) from the waveguide walls. The compensator 2 and the waveguide 1 are fixed, for example, in a frame, so that a gap is formed between them.

FIG. 2 illustrates a waveguide 1 and arrangement and operation of an in-coupling DOE 3 and an out-coupling DOE 4 according to an embodiment to the disclosure.

Referring to FIG. 2, as described above, the in-coupling DOE 3 and the out-coupling DOE 4 are placed either on the first side of the waveguide 1 or on the second side of the waveguide 1. The out-coupling DOE 4 is placed opposite the user's eye 5 and outputs a virtual image to the user's eye 5.

FIG. 2 illustrates a virtual image of a train, which is transferred from the projector to the waveguide via the in-coupling DOE 3. As is known, projector transforms a linear image into an angular one, that is, the virtual image projected by the projector consists of rays whose angles of incidence on the in-coupling DOE are sequentially decreasing from one edge of the image to the opposite edge of the image. For example, input angle of the virtual image-forming rays increases along the image length; if the image is viewed e.g., from left to right, then the image-forming ray, located to the right of the previous ray, is input at an angle smaller than the input angle of the previous ray.

Referring to FIG. 2, the image of train, projected by the projector, consists of rays whose incidence angles on the in-coupling DOE decrease from the leftmost car to the rightmost one. In other words, incidence angles on the in-coupling DOE of the rays that form the image of the leftmost car are greater than incidence angles on the in-coupling DOE of the rays that form the image of the rightmost car. With propagation inside the waveguide, angles of incidence/reflection (hereinafter, only the term "angle of incidence" will be mentioned, since angle of incidence is equal to angle of reflection) of the image-forming rays to/from the waveguide wall increase linearly as the ray travels inside the waveguide, since the waveguide thickness increases along the direction from the in-coupling DOE to the out-coupling DOE (waveguide thickness gradient). Dotted box shows change in the ray incidence angle on the wall inside the waveguide between two adjacent incidences of the same ray on the same wall of the waveguide as the rays travel inside the waveguide (for clarity, the shown train image consists of rays moving inside waveguide). It can be clearly seen that incidence angle of each image-forming ray increases, as it travels through the waveguide, by a certain amount (value 8 on the graph in the box).

The disclosure uses diffraction angle-selective output of virtual image to the user's eye. From each area of the out-coupling DOE 4 (e.g., areas (a), (b), and (c) in FIG. 2), only a portion of light incident on the out-coupling DOE 4 at an angle range determined during manufacture, referred to as out-coupling DOE angular selectivity range, is output by diffraction, to output virtual image-forming rays. To this end, the out-coupling DOE 4 is made light incidence angle-selective, that is, it has different diffraction efficiency for different light incidence angles on the out-coupling DOE. Referring to FIG. 2 in dotted circle, ray incidence angle on the out-coupling DOE is the angle between the ray and the normal to the out-coupling DOE at the point of incidence. For a certain range of ray incidence angles, which is the selectivity range of the out-coupling DOE, diffraction efficiency of the out-coupling DOE must be high, then the ray incident on the out-coupling DOE at an angle equal to or greater than the smallest angle of the predetermined angular selectivity range of the out-coupling DOE will be output from the waveguide to the user's eye. For all other incidence angles smaller than those within the above out-coupling DOE range, diffraction efficiency of the out-coupling DOE must be low so that the light does not leave the waveguide, but passes further along the waveguide. The out-coupling DOE selectivity range is selected and calculated at the manufacturing stage and depends on the initial requirements for virtual image, such as size, contrast, resolution, uniformity, or the like. The selectivity range limits output from the waveguide of rays incident on the out-coupling DOE at an angle less than the angle specified when manufacturing the out-coupling DOE, while all the rays incident on the out-coupling DOE at an angle greater than the angle specified when manufacturing the out-coupling DOE are output to the user's eye.

The selective out-coupling DOE can be, for example, a holographic diffraction grating, a relief-phase selective grating, a volumetric Bragg grating with angle-selective diffraction. For example, diffraction gratings of the related art with an angular selectivity width at half maximum less than 100 can be used; the condition depends on the specific implementation and requirements for the optical system.

Preferably, diffraction efficiency of the out-coupling DOE 4 is greater than 90%. To implement the out-coupling DOE, a DOE with a constant period along light propagation through the waveguide can be used. Due to the fact that the waveguide 1 has a thickness gradient from the in-coupling DOE to the out-coupling DOE, when light travels along the waveguide by TIR, the light incidence angle on the walls inside the waveguide changes, particularly, increases. The virtual image-forming light, propagating in the waveguide, comprises a set of beams of rays with different incidence angles. Moreover, each beam of rays, when output to the user's eye, forms one of the virtual image pieces (point-shaped). As the light propagates in the waveguide at the beginning of the out-coupling DOE (area (a) in FIG. 2), rays whose incidence angles correspond to the selectivity range of the out-coupling DOE specified during manufacture, as described above, are output, that is, the rays with the largest angles of incidence on the out-coupling DOE, which correspond to the edge of the virtual image, i.e., left car in FIG. 2. Light incident on the out-coupling DOE at smaller angles than the incidence angle from the aforementioned range propagates further along the waveguide. After re-reflection in the waveguide, incidence angle of the rays that did not leave the waveguide in area (a) will increase due to the waveguide thickness gradient. The rays whose incidence angles on the out-coupling DOE correspond to the selectivity range of the out-coupling DOE will be output from the waveguide to the user's eye (area (b) in FIG. 2). Light incident on the out-coupling DOE with smaller angles than angles of incidence from the above range will again propagate further along the waveguide. Further, after re-reflection in the waveguide, incidence angle of the rays that did not leave the waveguide in area (b) of FIG. 2 will increase due to the waveguide thickness gradient. And again, the rays whose incidence angle on the out-coupling DOE correspond to the selectivity range of the out-coupling DOE will be output from the waveguide to the user's eye (area (c) in FIG. 2). And this will happen until all the virtual image-forming light is output to the user's eye. Division into areas in parts (a), (b), and (c) in FIG. 2 is conditional and is given for clarity. Thus, the virtual image-forming rays are output from the waveguide as the ray incidence angle on the out-coupling DOE becomes corresponding to the selectivity range of the out-coupling DOE.

For example, as seen in FIG. 2, a ray constituting one of the virtual image points, shown as a solid line inside the waveguide 1, at points (a), (b), and (c) of the out-coupling DOE has a different, increasing incidence angle on the out-coupling DOE. Due to selectivity of the out-coupling DOE, this ray, upon falling on the out-coupling DOE at point (a), is not output from the waveguide, since its incidence angle is less than the incidence angles included in the selectivity range of the out-coupling DOE, so the ray diffracts to zero order, and passes further along the waveguide by TIR. On the instant the incidence angle of the ray under consideration satisfies the out-coupling DOE selectivity conditions, diffraction will occur with the first-order diffraction prevailing, and the light will exit the waveguide, in this example from point (c). For example, for incidence angles smaller than incidence angles within the out-coupling DOE selectivity range, the diffraction efficiency is low and the light diffracts to zero order and is not output from the waveguide. For incidence angles within the out-coupling DOE selectivity range, diffraction efficiency reaches values close to 100%, i.e., light diffracts to first order and will be output from the waveguide.

The external world image, corrected in accordance with the user's acuity problem using the compensator, gap and waveguide, enters the user's retina simultaneously with the virtual image, so the user with vision problem clearly sees the external world image augmented by the virtual image.

The augmented reality glasses comprise a left eye element and a right eye element, each of the left and right eye elements comprising the described optical combiner to display augmented reality with correction of user's acuity problems. The use of flat waveguides for augmented reality glasses is not energy efficient; in addition, the use of flat waveguides involves a loss of light, since not all the light enters the user's eye directly. The use of curved waveguides also involves a loss of light, and the resulting virtual image is blurry and has aberrations. Therefore, the waveguide must be shaped so that to output virtual image at the same angles at which it entered the waveguide. In this case, the selective out-coupling DOE outputs the visual field pieces which are certainly falling within the eye motion field. Combination of the waveguide shape with thickness increasing from the beginning of the in-coupling DOE to the end of the out-coupling DOE, and the highly selective out-coupling DOE compensates for aberrations by reducing the area through which the light exits, that is, due to vignetting, while the user sees a clear image focused in his eye.

Shape of the gap can be either constant or varying from left to right and/or top to bottom such that the gap shape provides increasing the waveguide thickness from the in-coupling DOE to the end of the out-coupling DOE, i.e., the gap can have a thickness gradient along its length or in the direction from the compensator to the waveguide or from the waveguide to the compensator. This is necessary when the system is used for users with acuity problems, such as strabismus.

Figure 3A:
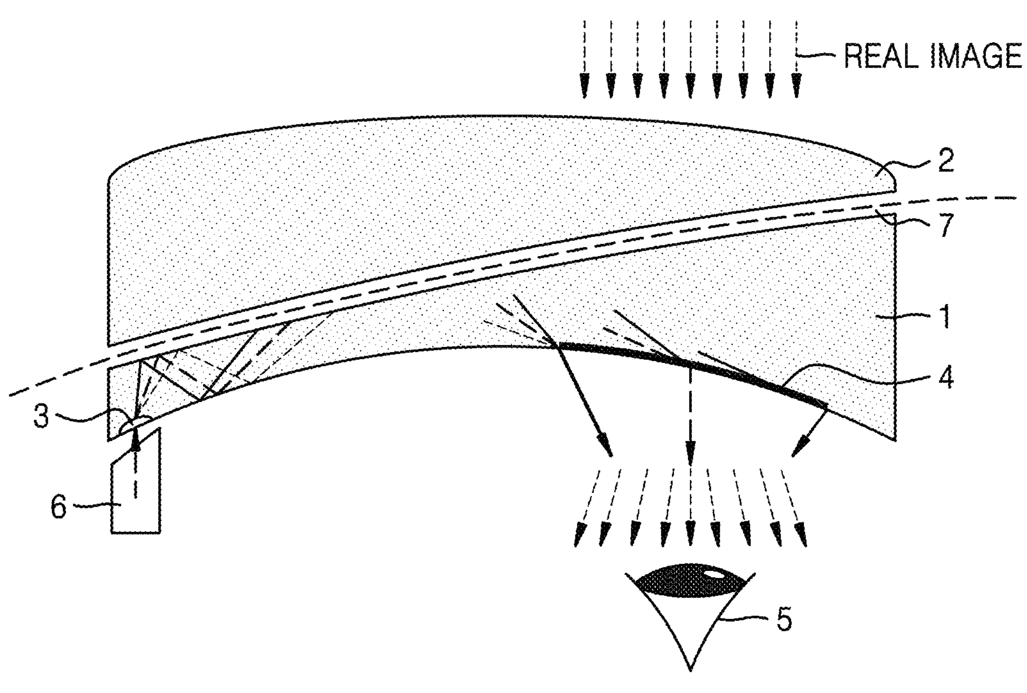
FIGS. 3A and 3B illustrate gaps of two shapes according to various embodiments to the disclosure.
Figure 3B:
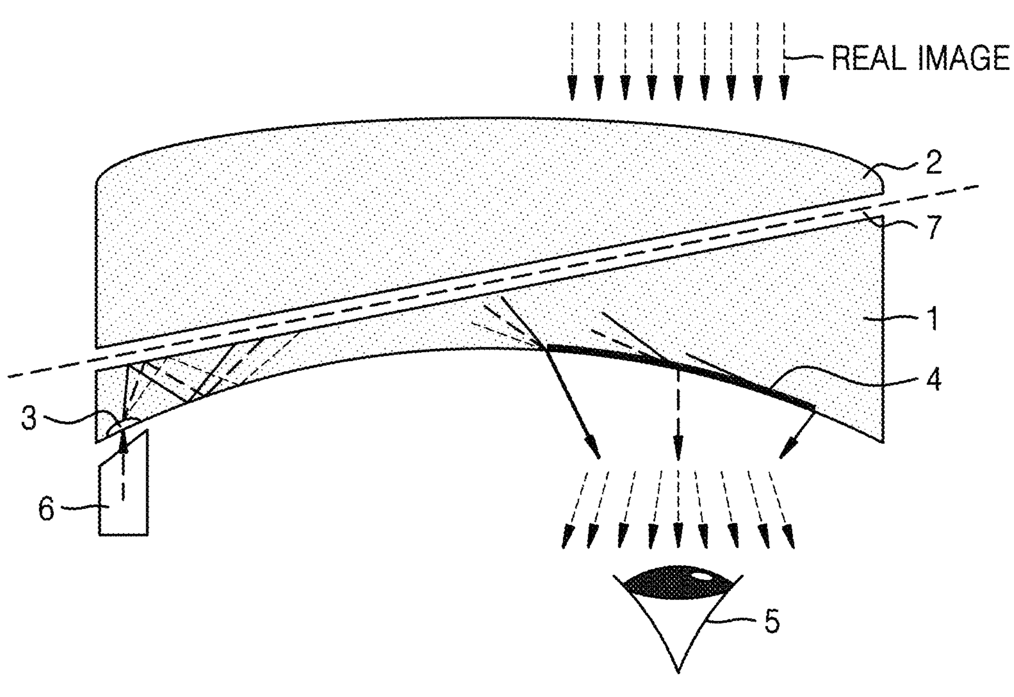

FIGS. 3A and 3B illustrate shapes of the gap according to various embodiments of the disclosure. FIG. 3A illustrates curved gap and FIG. 3B illustrates straight gap. If the compensator and/or waveguide have a curved shape of the second surface, then the gap will be curved. The optical combiner with a curved gap is more difficult to manufacture, but this shape of the gap provides an additional correction parameter.

Figure 4A:
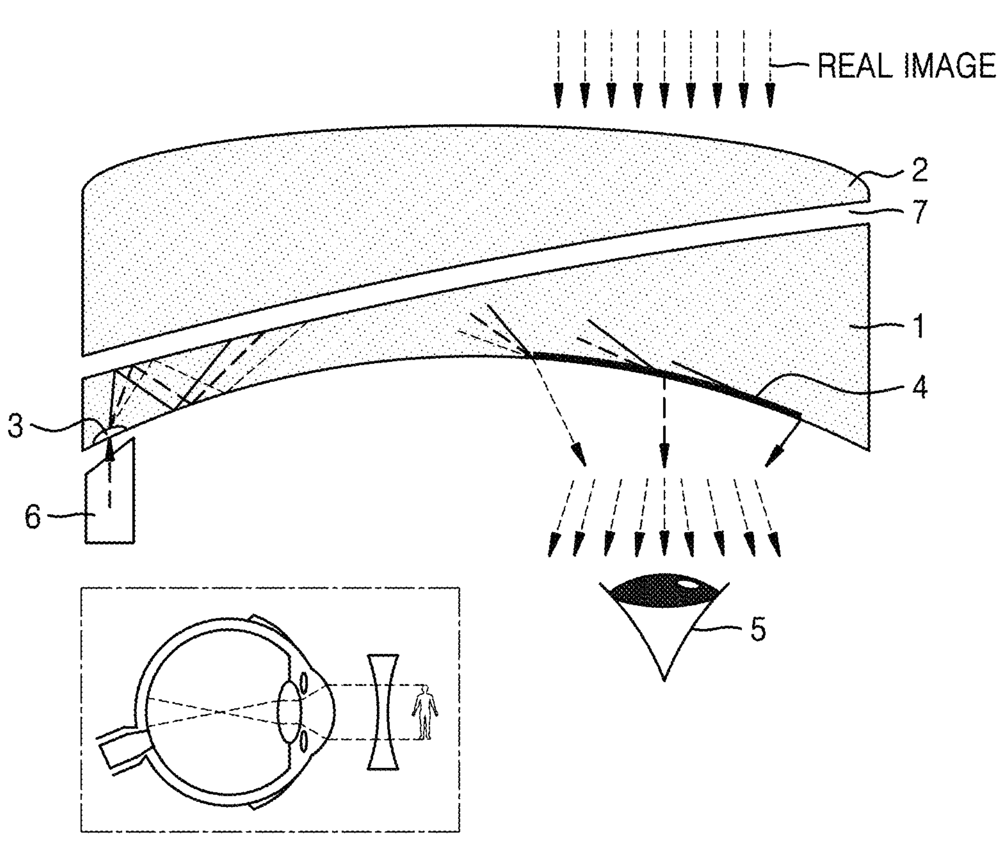
FIGS. 4A, 4B, and 4C illustrates optical combiner shapes for myopia, hyperopia, and astigmatism according to various embodiments to the disclosure.
Figure 4B:
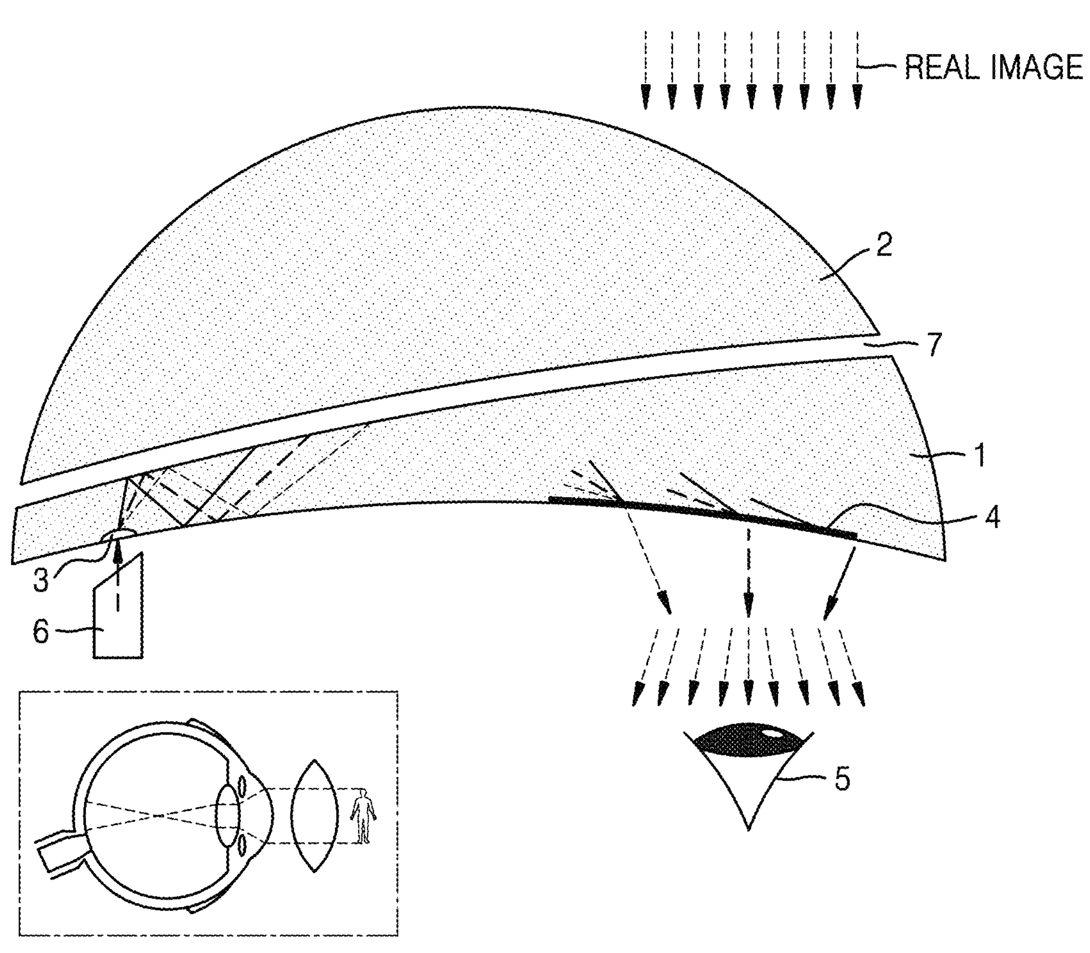
Figure 4C:
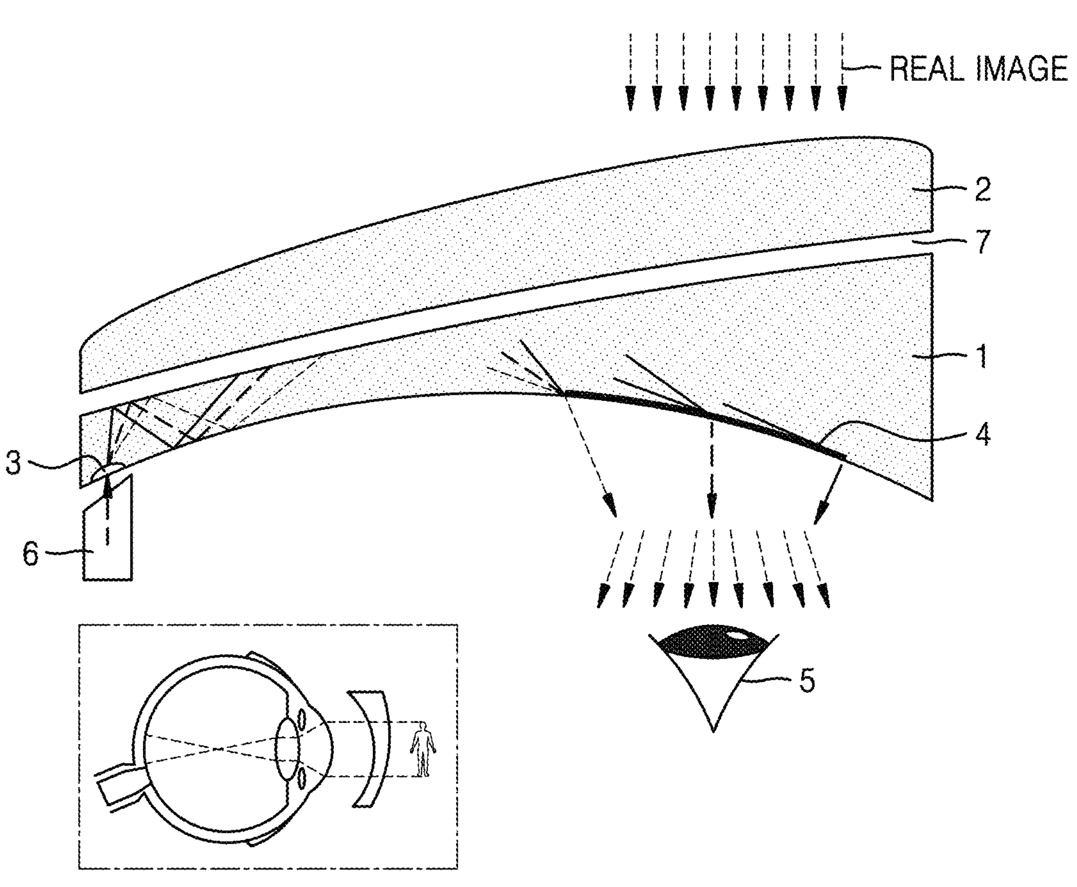

FIGS. 4A, 4B, and 4C illustrate shapes of the optical combiner that can be used according to various embodiments of the disclosure.

FIG. 4A with myopia, the optical combiner is configured to function as a concave lens (diffusing lens).

FIG. 4B with hyperopia, the optical combiner is configured to function as a convex lens (converging lens). and FIG. 4C with astigmatism, the optical combiner is configured to function as a cylindrical or toric lens.

It should be noted that to correct various visual impairments, only the compensator shapes differ, while the waveguide shapes can remain the same in all cases.

The augmented reality glasses with user's vision correction are tailored, like ordinary prescription glasses, after determining the user's vision, eye and head parameters, that is, according to parameters of each specific user. Optical combiners for right and left eye are made according to the user's individual parameters, selecting the compensator shape, e.g., one of shown in FIGS. 4A, 4B, and 4C, and calculating the optical combiner system (compensator-gap-waveguide) depending on individual user's vision parameters. The right and left eye elements, representing the manufactured optical combiners, are enclosed in a frame chosen by the user, and distance between out-coupling DOEs centers corresponds to the user's interpupillary distance.

The gap may be filled with a liquid, in particular, a photochromic liquid, which darkens with increasing sunlight.

The gap can be filled with a liquid crystal layer. The layer can function as a diffractive optical element making part of the system opaque, while a polarizer is placed in front of the LC layer, some of LC molecules can be oriented to a periodic structure, on which a portion of light from real image will diffract beyond the eye aperture and thus become invisible to the eye. The virtual image will propagate in the waveguide as before, but will appear to the user with more contrast in the darkening region.

The out-coupling DOE may be made of a liquid crystal layer; this out-coupling DOE may be turned on (i.e., output a virtual image), and off (i.e., not output a virtual image) under the effect of an electric field, such DOEs are known in the art. In addition, the out-coupling DOE can be configured as a holographic diffraction grating or a relief-phase diffraction grating. Such gratings can be made relief thickness and pattern selective, as is known in the art.

Period of the out-coupling DOE can be either constant or variable along the grating length. In this case, the out-coupling DOE will work as a diffractive lens having optical power, directing light into the user's eye at such angles that the user will see the virtual image corrected for his vision; however, this option is not the subject of the disclosure. Diffractive lenses having a variable-period structure and optical power at the same time are known in the art. Similarly, out-coupling DOE with a variable period can have optical power.

Figure 5A:
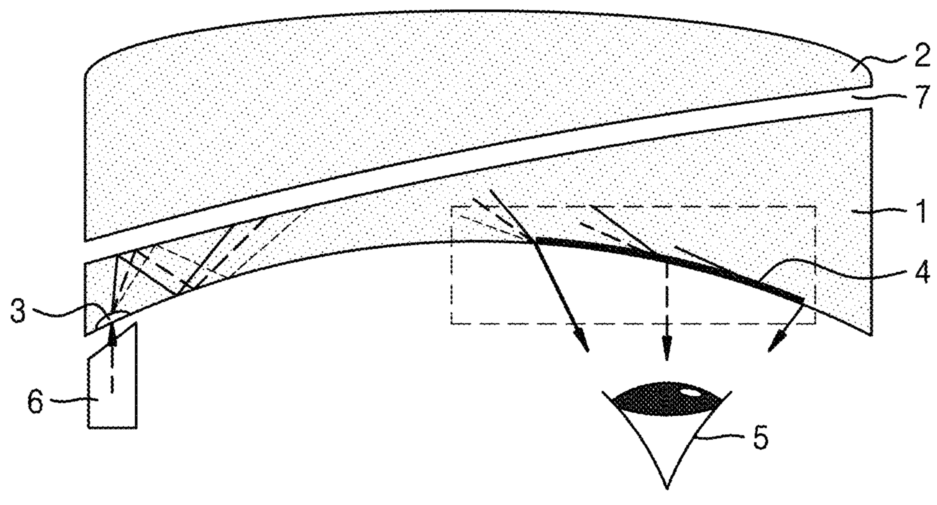
FIGS. 5A and 5B illustrate arrangement of out-coupling DOE: on eye-ward surface of waveguide, on opposite surface of waveguide, and adjacent to the gap according to various embodiments to the disclosure.
Figure 5B:
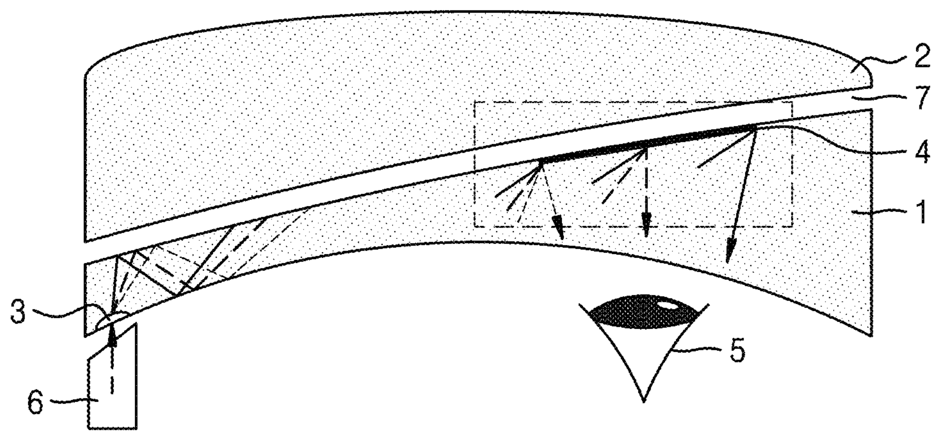

FIGS. 5A and 5B illustrate arrangement of an out-coupling DOE according to various embodiments of the disclosure. FIG. 5A illustrates arrangement of an out-coupling DOE on an eye-ward surface of the waveguide (first waveguide surface), and FIG. 5B illustrates arrangement of an out-coupling DOE on an opposite waveguide surface adjacent to a gap opposite a user's eye (second waveguide surface).

Referring to FIG. 5A, uncorrected virtual image enters the user's eye if the out-coupling DOE period is constant.

Referring to FIG. 5B, the waveguide is a corrective lens for the virtual image. Parameters of the waveguide for myopia, hyperopia, and astigmatism should be calculated for each particular case, such calculations are known in the art.

Out-coupling DOE can comprise a multiplex hologram, which is a more complex diffractive structure including multiple elementary diffractive elements.

For example, an out-coupling DOE can be formed by multiple multiplex holograms with the following characteristics:

diffraction efficiency, e.g., 33%-50%-100%; 25%-33%-50%-100% (for 4 holograms), or the like;

angular selectivity $<10°$ for each hologram; and unequal periods of holograms.

This increases the eye motion field and enables the user to view the image at different eye positions.

The use of multiplex holograms with unequal periods makes it possible to correct chromatism and/or equalize color intensity for virtual red green blue (RGB) image.

It is possible to use multiple out-coupling DOEs, each working with own part of the image. A first out-coupling DOE, which should output the left side of the image, has the lowest diffraction efficiency, that is, diffraction at the first out-coupling DOE produces zero-order diffraction that is not output from the waveguide. Moreover, the zero-order diffraction allows the left part of the image to propagate further along the waveguide with the incidence angle increasing. A second DOE has selectivity in a different incidence angle range, adjacent to the first one, and the second DOE outputs the light portion that diffracted to zero order at the first DOE and was not output from the waveguide; this light portion is output and propagates towards the eye at that same angle as from the first DOE and so on. Efficiency of a third DOE outputs only the right part of the image with maximum efficiency, since it works with the largest incidence angles.

Thus, the disclosure ensures formation of high-quality virtual and real images without additional prescription glasses for users with visual acuity problems, and reduces user eye fatigue. The disclosure features a convenient design and ergonomics for use in augmented reality glasses. Furthermore, the disclosure enables additional functions in augmented reality glasses, such as sun protection, use of occlusive, varifocal lenses for manufacturing the waveguide, so that a virtual image can be reconstructed along the distance.

The disclosure can be used in any AR, head up display (HUD), head mounted display (HMD) devices where it is necessary to have a compact design and high image quality for users with different visual acuity.

Although the disclosure has been described in connection with some illustrative embodiments, it should be understood that the disclosure is not limited to these specific embodiments. On the contrary, it is assumed that the disclosure includes all alternatives, amendments, and equivalents that may be included within the essence and scope of the claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An optical combiner for displaying augmented reality with user's vision correction, the optical combiner comprising:

a compensator;

a waveguide; and a virtual image projector;

wherein the compensator is configured to pass an external world image through its first side located opposite an external world, and its second side located opposite to the first side, wherein the waveguide has a first side located on a user side and a second side located opposite to the first side of the waveguide, and comprises an in-coupling diffractive optical element (DOE) and an out-coupling DOE placed on one of the first side or the second side of the waveguide, wherein a gap is provided between the second side of the compensator and the second side of the waveguide, the gap being configured to pass the external world image that has passed the compensator into the waveguide, wherein the waveguide is configured to pass the external world image, wherein the compensator, gap and waveguide are configured to correct user's vision problems when a user views the external world image, wherein the virtual image projector is arranged to input virtual image-forming rays via the in-coupling DOE into the waveguide, wherein the waveguide is configured to propagate virtual image-forming rays from the in-coupling DOE to the out-coupling DOE by total internal reflection from walls inside the waveguide, and output a virtual image via the out-coupling DOE to a user's eye, wherein the waveguide has a thickness gradient along the first and second side of the waveguide such that as the virtual image-forming rays propagate inside the waveguide from the in-coupling DOE to the out-coupling DOE, incidence angle of the rays on the walls inside the waveguide increases, the first side of the waveguide has a curvature with a center thereof located on the user eye-ward side, and wherein the out-coupling DOE is placed opposite the user's eye, and is configured to output virtual image-forming rays, incident on the out-coupling DOE at an angle equal to or greater than a smallest angle of a predetermined angular selectivity range of the out-coupling DOE, from the waveguide to the user's eye.

2. The optical combiner of claim 1, wherein the gap has a uniform thickness along its entire length.

3. The optical combiner of claim 1, wherein the gap has a thickness gradient along the compensator and the waveguide.

4. The optical combiner of claim 1, wherein the gap has a thickness gradient in a direction from the compensator to the waveguide.

5. The optical combiner of claim 1, wherein the gap has a thickness gradient in a direction from the waveguide to the compensator.

6. The optical combiner of claim 1, wherein the compensator is shaped such that the gap is curved.

7. The optical combiner of claim 1, wherein the waveguide is shaped such that the gap is curved.

8. The optical combiner of claim 1, wherein the compensator and the waveguide are shaped such that the gap is straight.

9. The optical combiner of claim 1, wherein the compensator, gap and waveguide are configured to function as a diverging lens.

10. The optical combiner of claim 1, wherein the compensator, gap and waveguide are configured to function as a converging lens.

11. The optical combiner of claim 1, wherein the compensator, gap and waveguide are configured to function as a cylindrical lens.

12. The optical combiner of claim 1, wherein the compensator, gap and waveguide are configured to function as a toric lens.

13. The optical combiner of claim 1, wherein the compensator and the waveguide are fixed in a frame such that they are separated by a gap.

14. The optical combiner of claim 1, wherein the gap is air gap.

15. The optical combiner of claim 1, wherein the gap is filled with a liquid.

16. The optical combiner of claim 15, wherein the liquid is a photochromic liquid.

17. The optical combiner of claim 1, wherein the gap is formed by a layer of liquid crystals.

18. The optical combiner of claim 1, wherein the out-coupling DOE is formed by a layer of liquid crystals.

19. The optical combiner of claim 1, wherein the out-coupling DOE is recorded as a holographic diffraction grating.

20. The optical combiner of claim 1, wherein the out-coupling DOE is a relief-phase selective diffraction grating.

21. The optical combiner of claim 1, wherein the out-coupling DOE is recorded as a multiplex hologram.

22. The optical combiner of claim 1, wherein the out-coupling DOE is a volume Bragg diffraction grating with angle-selective diffraction.

23. The optical combiner of claim 1, wherein the out-coupling DOE is placed on a first surface of the waveguide.

24. The optical combiner of claim 1, wherein the out-coupling DOE is placed on a second surface of the waveguide.

25. The optical combiner of claim 1, wherein the out-coupling DOE has diffraction efficiency over 90%.

26. Augmented reality glasses comprising:

a left eye element; and a right eye element, wherein each of the left eye element and the right eye element comprising an optical combiner of claim 1 for displaying augmented reality with user's vision correction.

27. A method for operating an optical combiner for displaying augmented reality with user's vision correction, the method comprising:

transferring a virtual image to user's eye, including:

generating a virtual image by a virtual image projector, and inputting, via an in-coupling DOE, virtual image-forming rays into a waveguide, wherein the virtual image-forming rays propagate from the in-coupling DOE to an out-coupling DOE in waveguide mode by total internal reflection from walls inside the waveguide, wherein, as the virtual image-forming rays propagate inside the waveguide from the in-coupling DOE to the out-coupling DOE, incidence angle of the rays on the walls inside the waveguide increases, wherein outputting the virtual image-forming rays to the user's eye via the out-coupling DOE such that only the rays' incident on the out-coupling DOE at an angle equal to or greater than a smallest angle of a predetermined angular selectivity range of the out-coupling DOE are output, and wherein remaining rays propagate further along the waveguide, increasing their incidence angle on the waveguide walls, and are output at an area of the out-coupling DOE, where their incidence angle on the out-coupling DOE becomes equal to or greater than the smallest angle of the predetermined angular selectivity range of the out-coupling DOE, and outputting an external world image to the user's eye, including:

passing an external world image through a compensator, a gap and a waveguide, while correcting the external world image in accordance with user's vision problems, wherein the transferring of the virtual image and the outputting of the external world image are performed simultaneously to form, on a user's retina, an external world image corrected to compensate for the user's vision problems and augmented by the virtual image.

28. The method of claim 27, wherein the gap has a uniform thickness along its entire length.

29. The method of claim 27, wherein the gap has a thickness gradient along the compensator and the waveguide.

30. The method of claim 27, wherein the gap has a thickness gradient in a direction from the compensator to the waveguide.

* * * * *